United States Patent
Kim et al.

(10) Patent No.: US 12,145,429 B2
(45) Date of Patent: Nov. 19, 2024

(54) SEALING ASSEMBLY FOR TWIN SWING GATE

(71) Applicants: HYUNDAI MOTOR COMPANY, Seoul (KR); Kia Corporation, Seoul (KR)

(72) Inventors: Je-Yeon Kim, Seoul (KR); Jang-Hoon Kim, Hwaseong-si (KR); Jae-Yun Lee, Yangsan-si (KR); Dong-Hee Ma, Hwaseong-si (KR); Min-Hyoung Ahn, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/323,111

(22) Filed: May 24, 2023

(65) Prior Publication Data
US 2024/0174067 A1 May 30, 2024

(30) Foreign Application Priority Data

Nov. 30, 2022 (KR) .......................... 10-2022-0163996

(51) Int. Cl.
| | |
|---|---|
| *B60J 10/40* | (2016.01) |
| *B60J 10/30* | (2016.01) |
| *B60J 10/86* | (2016.01) |
| *B60J 5/10* | (2006.01) |

(52) U.S. Cl.
CPC ............... *B60J 10/87* (2016.02); *B60J 10/30* (2016.02); *B60J 10/40* (2016.02); *B60J 5/108* (2013.01)

(58) Field of Classification Search
CPC ... B60J 10/87; B60J 10/30; B60J 10/40; B60J 10/86; B60J 5/108; B60J 5/0478; B60J 5/0479; B60R 13/06
See application file for complete search history.

(56) References Cited

U.S. PATENT DOCUMENTS

| | | | | |
|---|---|---|---|---|
| 2,860,911 | A | * | 11/1958 | Cotter ...................... B60J 10/80 296/202 |
| 3,467,426 | A | * | 9/1969 | Hix .......................... B60J 5/108 292/DIG. 32 |
| 3,653,155 | A | * | 4/1972 | De Brunyn, Jr. et al. ................... E06B 7/20 49/368 |
| 3,886,686 | A | * | 6/1975 | Urbanick .............. E06B 7/2314 49/495.1 |
| 3,940,886 | A | * | 3/1976 | Ellingson, Jr. ...... E05B 65/1066 49/141 |
| 4,015,368 | A | * | 4/1977 | Court ...................... B60J 10/86 49/495.1 |

(Continued)

FOREIGN PATENT DOCUMENTS

KR 20200063169 A 6/2020

*Primary Examiner* — Justin B Rephann
(74) *Attorney, Agent, or Firm* — Slater Matsil, LLP

(57) ABSTRACT

An embodiment is a sealing assembly for a twin swing gate of a vehicle, the sealing assembly including a first gate of which an outside end portion is hinge-connected to a vehicle, a second gate of which an outside end portion is hinge-connected to the vehicle and configured to be rotated in a direction opposite to rotation of the first gate, and a center bar unit along a height direction of the vehicle on an inside end portion of the first gate, the center bar being configured to rotate in conjunction with opening or closing the first gate.

20 Claims, 18 Drawing Sheets

(56) References Cited

U.S. PATENT DOCUMENTS

| | | | | |
|---|---|---|---|---|
| 4,403,452 | A * | 9/1983 | Urbanick | B60J 5/108 49/495.1 |
| 4,958,883 | A * | 9/1990 | Iwaki | B60R 13/0243 296/146.7 |
| 5,349,782 | A * | 9/1994 | Yulkowski | E05B 63/06 49/366 |
| 5,499,475 | A * | 3/1996 | Court | B60J 10/40 49/495.1 |
| 5,581,946 | A * | 12/1996 | Lin | E05C 19/001 49/368 |
| 5,816,309 | A * | 10/1998 | Paradise | E05B 65/0085 160/40 |
| 6,158,171 | A * | 12/2000 | Kellogg | B60J 10/40 49/489.1 |
| 8,123,278 | B1 * | 2/2012 | McKenney | B60J 5/0479 49/320 |
| 8,328,268 | B2 * | 12/2012 | Charnesky | B60J 10/86 292/DIG. 3 |
| 8,328,269 | B2 * | 12/2012 | Krajenke | B60R 13/0243 296/146.1 |
| 8,414,063 | B2 * | 4/2013 | Watson | B60J 10/24 296/146.9 |
| 8,484,900 | B2 * | 7/2013 | Charnesky | E05B 77/12 49/502 |
| 8,485,586 | B2 * | 7/2013 | Netherland, III | E05C 19/001 296/146.4 |
| 8,555,552 | B2 * | 10/2013 | Hooton | B60J 10/244 49/477.1 |
| 8,607,505 | B2 * | 12/2013 | Bazzi | B60J 10/84 49/366 |
| 8,839,564 | B2 * | 9/2014 | Happel | E06B 7/2312 49/495.1 |
| 8,950,797 | B2 * | 2/2015 | Watson | B60J 10/24 296/146.9 |
| 9,151,107 | B2 * | 10/2015 | Kaczmarczyk | B60J 10/87 |
| 9,751,390 | B2 * | 9/2017 | Roth | B60J 10/248 |
| 10,099,769 | B2 * | 10/2018 | Macaraeg, Jr. | B64C 1/1461 |
| 10,322,625 | B2 * | 6/2019 | Sakakibara | B60J 10/40 |
| 11,192,433 | B2 * | 12/2021 | Lee | B60J 10/23 |
| 11,312,217 | B2 * | 4/2022 | Ma | E06B 7/21 |
| 11,358,456 | B2 * | 6/2022 | Lee | B60J 10/86 |
| 2012/0019023 | A1 * | 1/2012 | Konchan | B60J 10/40 296/146.9 |
| 2012/0023830 | A1 * | 2/2012 | Bazzi | B60J 10/84 49/484.1 |
| 2012/0153678 | A1 * | 6/2012 | Konchan | B60J 10/87 296/202 |
| 2012/0193938 | A1 * | 8/2012 | Krajenke | B60J 5/0479 296/146.7 |
| 2013/0097936 | A1 * | 4/2013 | Fukuda | B60J 5/105 49/476.1 |
| 2015/0082705 | A1 * | 3/2015 | Kaczmarczyk | B60J 10/40 49/368 |
| 2017/0342767 | A1 * | 11/2017 | Sakakibara | B60J 5/0479 |
| 2020/0189372 | A1 * | 6/2020 | Lee | B60J 10/40 |
| 2020/0308882 | A1 * | 10/2020 | Salter | E05B 81/08 |
| 2020/0308891 | A1 | 10/2020 | Shi et al. | |
| 2020/0338974 | A1 * | 10/2020 | Lee | B60J 10/86 |

* cited by examiner

SEALING ASSEMBLY FOR TWIN SWING GATE

CROSS-REFERENCE TO RELATED APPLICATIONS

This application claims priority to Korean Patent Application No. 10-2022-0163996, filed on Nov. 30, 2022, which is incorporated herein by reference in its entirety.

TECHNICAL FIELD

The present disclosure relates to a sealing assembly for a twin swing gate.

BACKGROUND

Various types of gates are mounted in vehicles in order for an occupant to get in or get out of the vehicles or in order to load or unload goods onto or from the vehicles.

Among the various types of gates, a twin swing gate has a pair of gates. Between the pair of gates, one side of one gate and one side of the other gate are arranged adjacent to each other. The other side of the one gate and the other side of the other gate are hinge-connected to a vehicle body. For example, as illustrated in FIG. 1, a first gate 10 and a second gate 20 are provided, as a tailgate, on a rear surface of a vehicle 1. Only one of the first gate 10 and the second gate 20 operates to be open and closed, or both thereof operate to be open and closed.

However, the order of opening and the order of closing have to be predetermined in order to provide sealing between respective portions of the first gate 10 and the second gate 20 of this twin swing gate that are brought into contact with each other. One of the first gate 10 and the second gate 20, when open and closed, interferes with a weatherstrip installed between the first gate 10 and the second gate 20, thereby performing improper opening and closing operations. In order to prevent this interference, the weatherstrip is mounted on any one of the first gate 10 and the second gate 20. When performing the opening operation, the other one thereof on which the weatherstrip is not installed is first open, and when performing the closing operation, the one thereof on which the weatherstrip is installed is first closed. That is, when performing the opening operation, the first gate 10 is first open, and then the second gate 20 is open. When performing the closing operation, the second gate 20 is first closed and then the first gate 10 is closed.

During heavy rain fall, in a case where the vehicle is parked in the open air or travels on a road, rainwater permeates between the first gate 10 and the second gate 20. Moreover, when washing the vehicle, high-pressure washing water permeates between the first gate 10 and the second gate 20. For this reason, the first gate 10 and the second gate 20 have to be tightly engaged with each other in order to ensure sealing therebetween. To this end, the order of opening the first gate 10 and the second gate 20 and the order of closing the first gate 10 and the second gate 20 need to be predetermined.

SUMMARY

The present disclosure relates to a sealing assembly for a twin swing gate, the sealing assembly providing sealing between gates of a twin swing gate that is mounted on a vehicle in such a manner as to be open and closed in opposite directions.

An object of the present disclosure, which is contrived to solve the above-mentioned problem, is to provide a sealing assembly for a twin swing gate, the sealing assembly being capable of opening and closing gates of the twin swing gate mounted on a vehicle regardless of the order of opening and the order of closing and, at the same time, blocking water, foreign material, or noise from being introduced into a vehicle through the gates.

In order to accomplish the above-mentioned object, according to an aspect of the present disclosure, there is provided a sealing assembly for a twin swing gate, the sealing assembly including: a first gate of which an outside end portion is hinge-connected to a vehicle; a second gate of which an outside end portion is hinge-connected to the vehicle in such a manner as to be rotated in a direction opposite to rotation of the first gate; and a center bar unit, installed along a height direction of the vehicle on an inside end portion of the first gate, that is rotated in conjunction with opening or closing the first gate and that, when the first gate is closed, is brought into contact with an inside end portion of the second gate and, when the first gate is open, is spaced away from the inside end portion of the second gate.

In the sealing assembly, the center bar unit may include: a center bar formed along the height direction of the vehicle; a first weatherstrip fitted onto one side of the center bar and thus providing sealing between the center bar and the first gate; and a second weatherstrip fitted onto the other side of the center bar and thus providing sealing between the center bar and the second gate.

In the sealing assembly, the center bar may include: a weatherstrip fastening portion bidirectionally extending along a width direction of the center bar in such a manner that the first weatherstrip and the second weatherstrip are each fitted onto the weatherstrip fastening portion; and a connection portion connecting the center bar and the weatherstrip fastening portion to each other may be formed on the center bar.

In the sealing assembly, the center bar may be positioned, along a height direction of the first gate, at the same distance from an inner panel of the first gate.

In the sealing assembly, the weatherstrip fastening portion may be formed in such a manner that the closer the center bar and an outer panel of the first gate are to each other, the shorter a length of the weatherstrip fastening portion.

The sealing assembly may further include: a center bar hinge hinge-connecting the center bar to the first gate, wherein the center bar hinge may include: a stationary portion mounted on the first gate; a rotatable portion mounted on the center bar and rotating with respect to the stationary portion; and a hinge shaft passing through the stationary portion and the rotatable portion and thus hinge-connecting the stationary portion and the rotatable portion to each other. In the sealing assembly, the center bar hinge may further include a spring elastically supporting in such a manner that the rotatable portion is brought into being folded to the stationary portion.

The sealing assembly may further include a guide installed on a vehicle body and rotating the center bar in conjunction with opening or closing the first gate.

In the sealing assembly, a guide protrusion may be on an upper end portion or a lower end portion of the center bar, and a guide groove guiding the guide protrusion may be formed in the guide in such a manner that the center bar is rotated in conjunction with opening or closing the first gate.

In the sealing assembly, the guide groove may be concavely formed in the shape of a semicircle in a manner that faces toward the inside of the vehicle, and the guide groove may be formed to be open at one end portion thereof adjacent to the first gate in such a manner that the guide protrusion is inserted into or removed from one end portion thereof.

In the sealing assembly, an inside end portion of the second gate may be positioned more rearward toward the rear of the vehicle than the center bar unit.

With the sealing assembly for a twin swing gate having the configuration as described above, the interference between the weatherstrip and one of the first gate and the second gate is prevented while the center bar is rotated in conjunction with an operation of opening or closing the gate. Thus, the first gate and the second gate may be open or closed regardless of the order of opening and the order of closing.

Moreover, a user can open and close the first gate and the second gate regardless of the order of opening and the order of closing. Thus, convenience of use can be increased.

DETAILED DESCRIPTION OF ILLUSTRATIVE EMBODIMENTS

Figure 1:
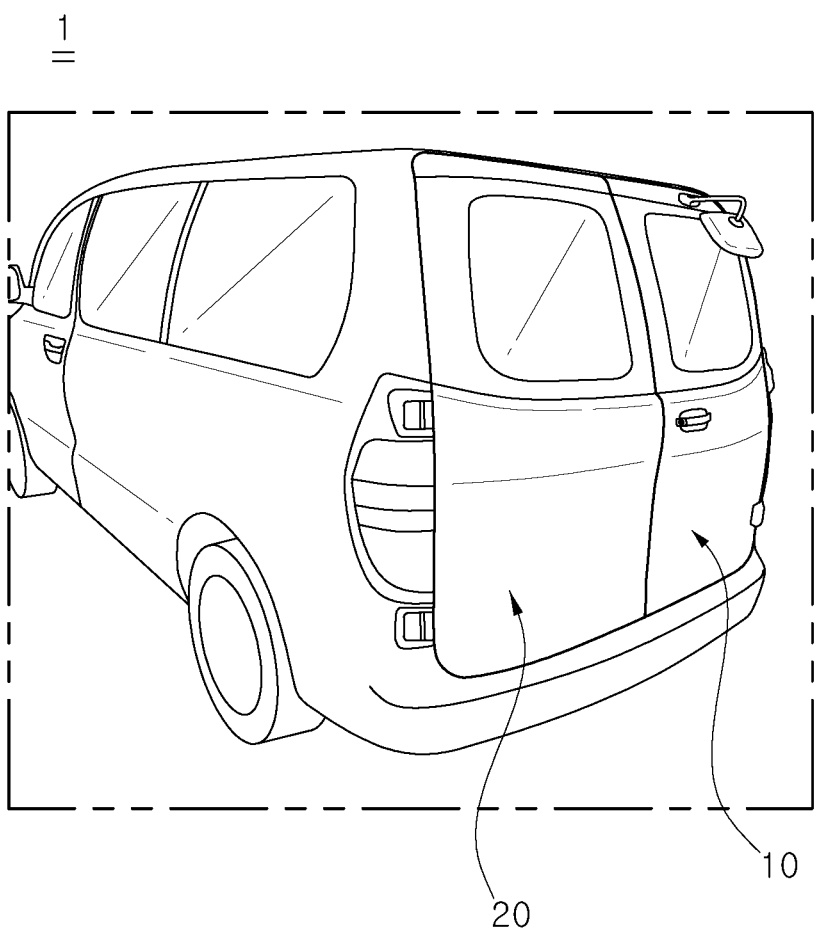
FIG. 1 is a perspective view illustrating a state where a twin swing gate is installed on a vehicle.
Figure 2:
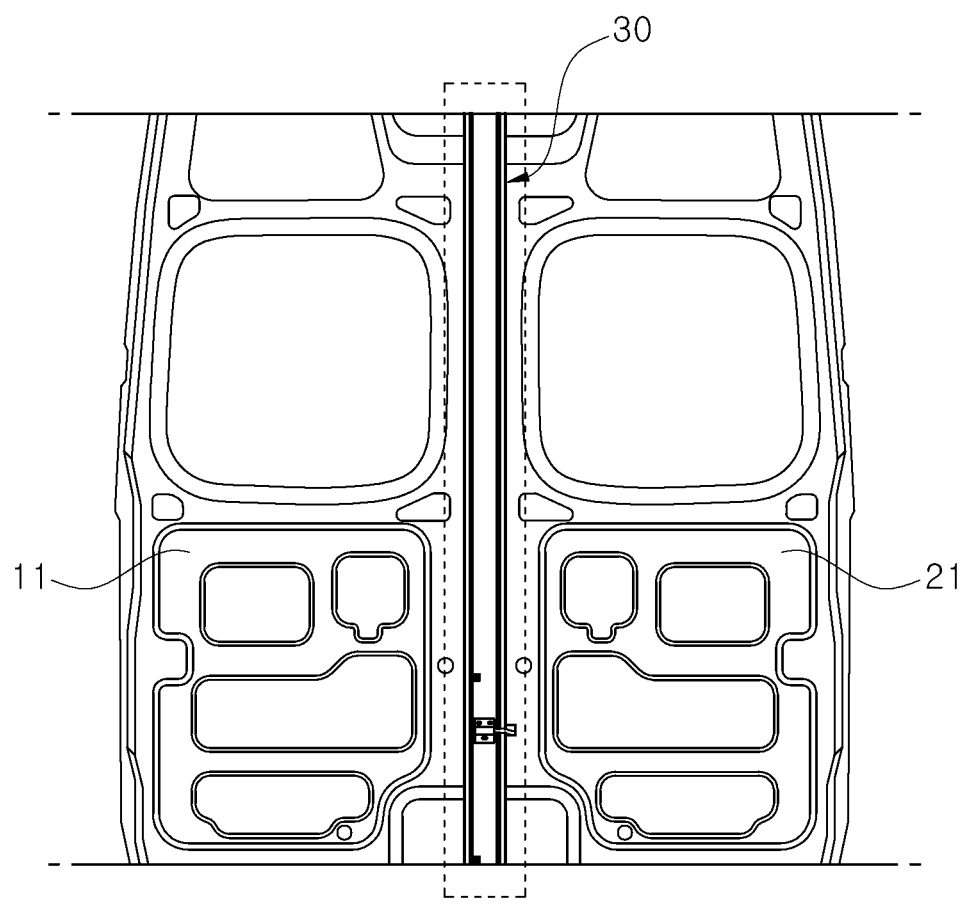
FIG. 2 is a front view illustrating a twin swing gate on which a sealing assembly for a twin swing gate according to the present disclosure is mounted.
Figure 3:
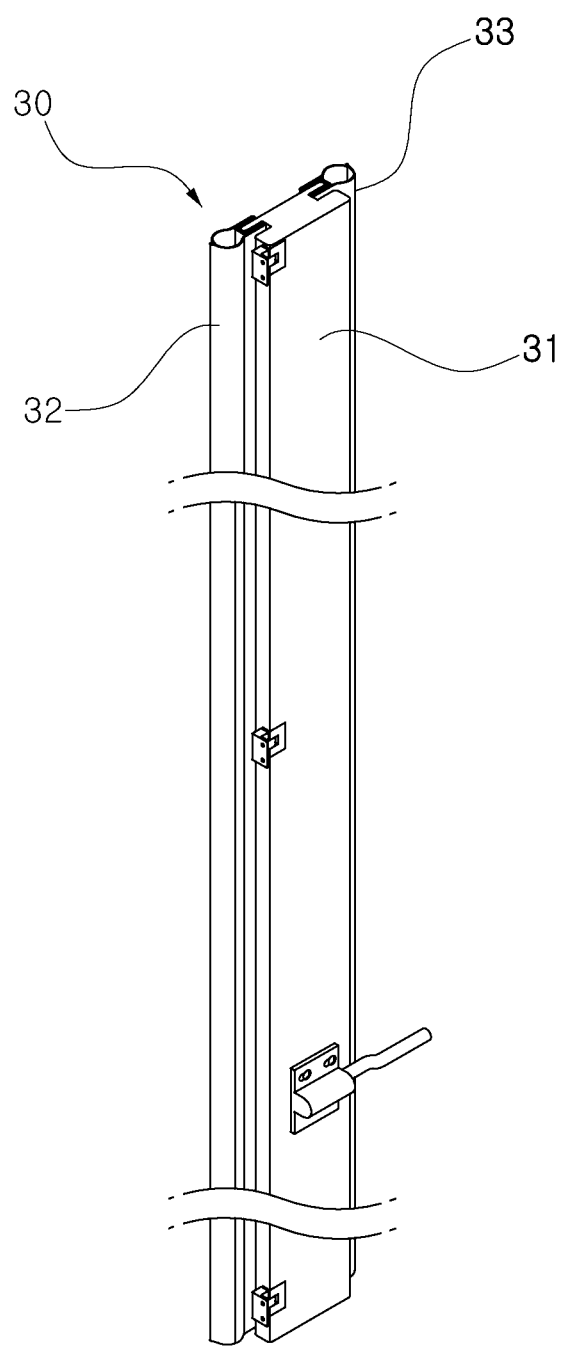
FIG. 3 is a perspective view illustrating the sealing assembly for a twin swing gate according to the present disclosure.
Figure 4:
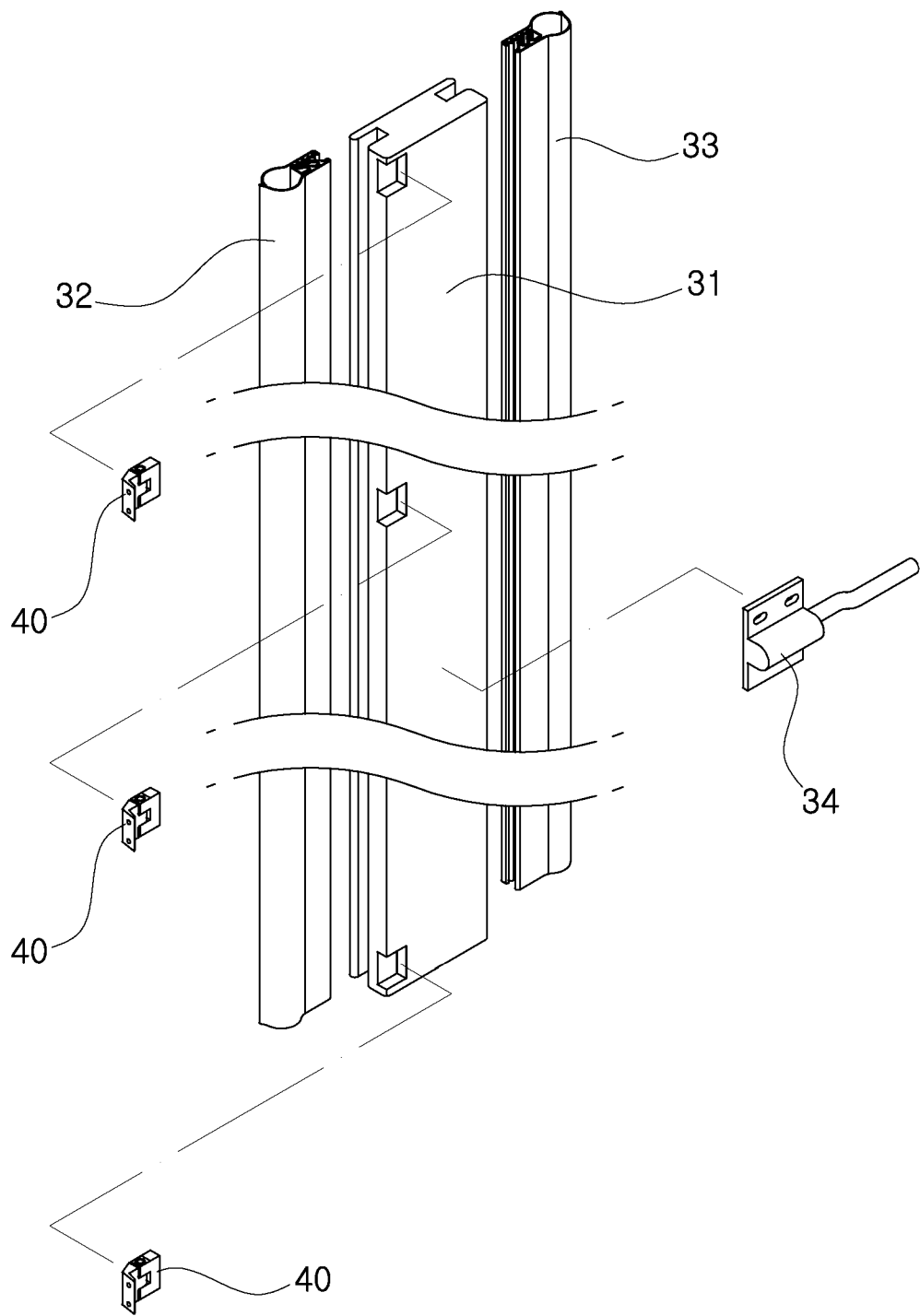
FIG. 4 is an exploded perspective view illustrating the sealing assembly for a twin swing gate according to the present disclosure.
Figure 5:
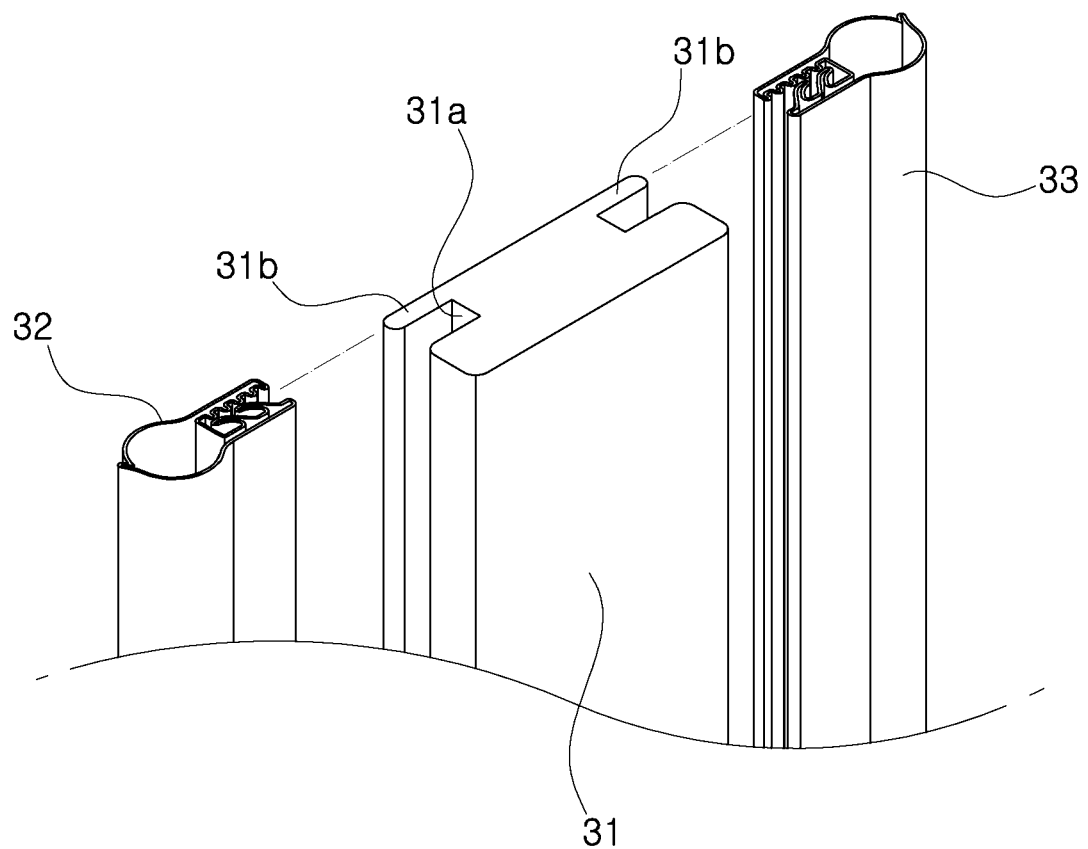
FIG. 5 is an enlarged view illustrating essential constituent elements of the sealing assembly for a twin swing gate according to the present disclosure in FIG. 4.
Figure 6:
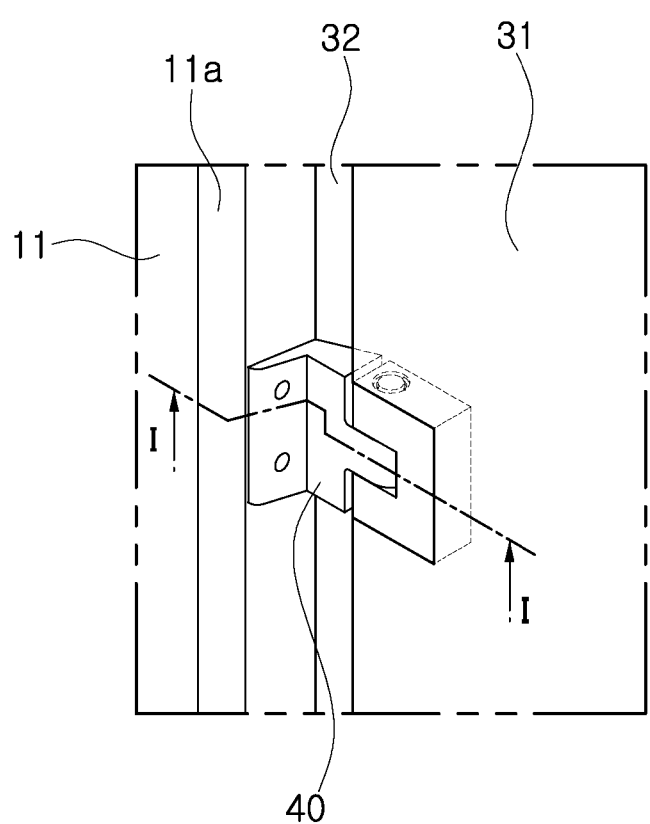
FIG. 6 is an enlarged perspective view illustrating a state where the sealing assembly for a twin swing gate according to the present disclosure is installed on a gate.
Figure 7:
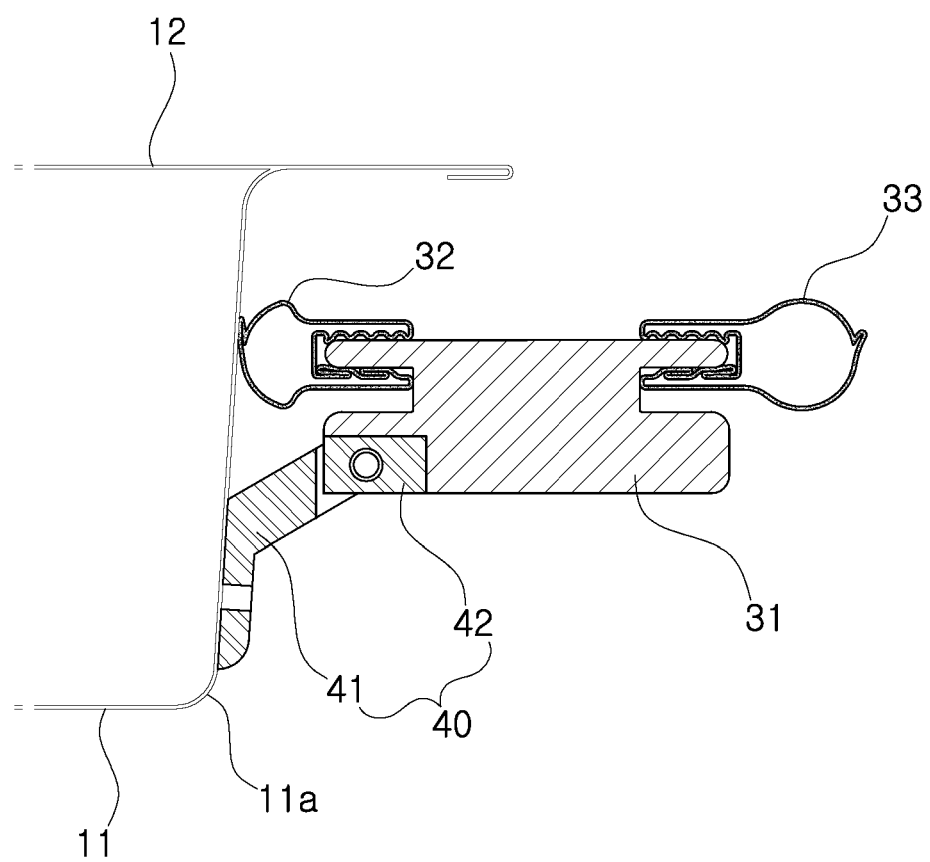
FIG. 7 is a cross-sectional view taken along line I-I on FIG. 6.
Figure 8:
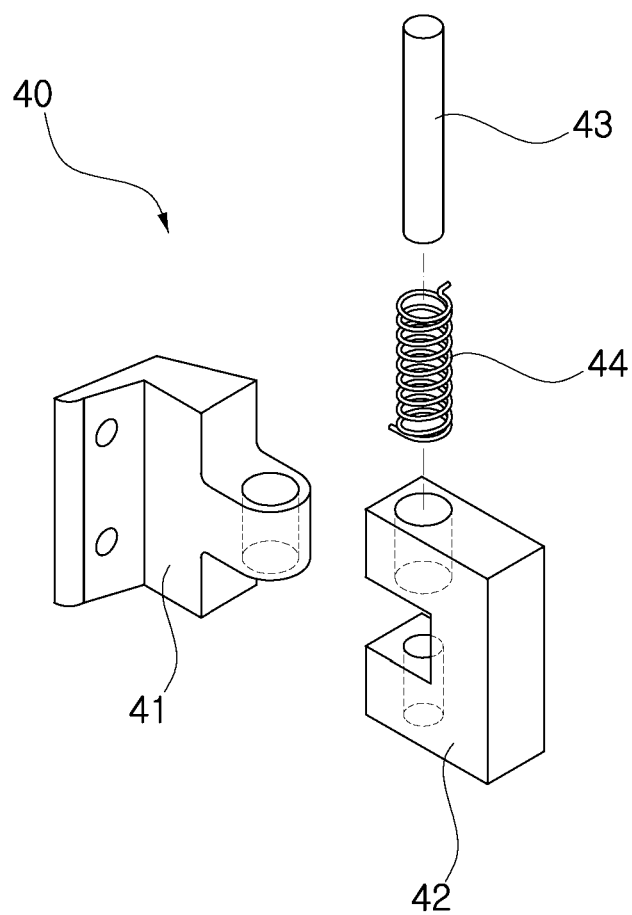
FIG. 8 is an exploded perspective view of a center bar hinge for installing the sealing assembly for a twin swing gate according to the present disclosure to the gate.
Figure 9:
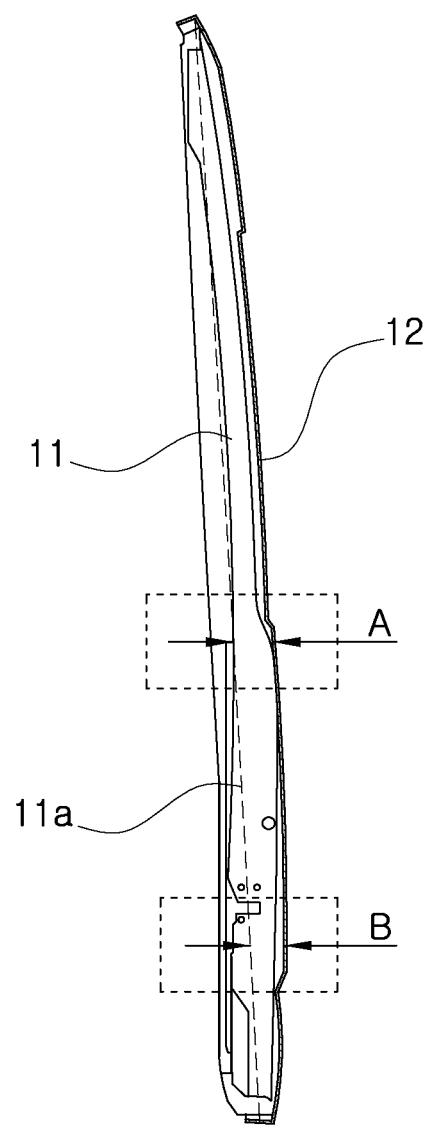
FIG. 9 is a side view illustrating the gate on which the sealing assembly for a twin swing gate according to the present disclosure is installed.

A sealing assembly for a twin swing gate according to the present disclosure will be described in detail below with reference to the accompanying drawings.

The sealing assembly for a twin swing gate according to the present disclosure includes: a first gate 10 of which an outside end portion is hinge-connected to a vehicle 1; a second gate 20 of which an outside end portion is hinge-connected to the vehicle 1 in such a manner as to be rotated in a direction opposite to rotation of the first gate 10; and a center bar unit 30, installed along a height direction of the vehicle 1 on an inside end portion of the first gate 10, that is rotated in conjunction with opening or closing the first gate 10 and that, when the first gate 10 is closed, is brought into contact with an inside end portion of the second gate 20 and, when the first gate 10 is open, is spaced away from the inside end portion of the second gate 20.

The first gate 10 and the second gate 20 (may also be referred to as a first door 10 and a second door 20) are each installed in a swinging manner on one side of the vehicle 1. For example, the outside end portion of the first gate 10 is hinge-connected by a gate hinge shaft 13 to the vehicle 1, and the outside end portion of the second gate 20 is also hinge-connected to the vehicle 1 with a gate hinge shaft 23 in between. The respective inside end portions of the first gate 10 and the second gate 20 are positioned adjacent to each other, and the first gate 10 and the second gate 20 are rotated in opposite directions.

Accordingly, when the first gate 10 and the second gate 20 are closed, the respective inside end portions thereof are kept facing each other while being spaced a predetermined distance apart away from each other. When the first gate 10 and the second gate 20 need to be open, they are open by rotating the respective inside end portions thereof. When this twin swing gate needs to be open, the first gate 10 and the second gate 20 are rotated in opposite directions, and thus the middle portion of the twin swing gate is all open.

The first gate 10 is made by joining an inner panel 11 and an outer panel 12 to each other, and the second gate 20 is made by joining an inner panel 21 and an outer panel 22 to each other. A portion of the inside end portion of the first gate 10 where the inner panel 11 and the outer panel 12 are jointed to each other is positioned toward the rear of the vehicle 1. Also, a portion of the inside end portion of the second gate 20 where the inner panel 21 and the outer panel 22 are jointed to each other is positioned toward the rear of the vehicle 1.

The center bar unit 30 is installed between the first gate 10 and the second gate 20, that is, installed along the height direction of the vehicle 1 on the inside end portion of any one of the first gate 10 and the second gate 20. The center bar unit 30 is rotated in conjunction with opening or closing the gate on which the center bar unit 30 is installed. When the gate on which the center bar unit 30 is installed is closed, the center bar unit 30 is brought into contact with the inside end portion of the other one thereof on which the center bar unit 30 is not installed. When one thereof on which the center bar unit 30 is installed is open, the center bar unit 30 is spaced away from the inside end portion of the other one thereof on which the center bar unit 30 is not installed.

As an example, a case where the center bar unit 30 is installed on the first gate 10 will be described below. The first gate 10 and the second gate 20 are symmetrically installed on the vehicle 1. Therefore, although the center bar unit 30 is installed on the second gate 20, the center bar unit 30 operates in the same manner.

The center bar unit 30 is installed on the inside end portion of the first gate 10, that is, installed along the height direction of the vehicle 1 on an end portion of the first gate 10 that is opposite to an end portion thereof that is hinge-connected to a vehicle body. The center bar unit 30 is rotated in conjunction with opening or closing the first gate 10.

When the first gate 10 is closed, the center bar unit 30 is brought into contact with the inside end portion of the second gate 20 and thus provides sealing between the first gate 10 and the second gate 20.

When the first gate 10 is open, the center bar unit 30 is rotated in conjunction with opening the first gate 10, and thus is spaced away from the inside end portion of the second gate 20. The center bar unit 30 is rotated in conjunction with opening the first gate 10, and thus, the inside end portion of the second gate 20 is positioned more toward the outside (the rear) of the vehicle 1 than the center bar unit 30. Therefore, the first gate 10 on which the center bar unit 30 is installed may be open without the second gate 20 interfering with the center bar unit 30.

The center bar unit 30 includes: a center bar 31 formed along a height direction of the first gate 10; a first weatherstrip 32 that is fitted onto one side of the center bar 31 and thus provides sealing between the center bar 31 and the first gate 10; and a second weatherstrip 33 that is fitted onto the other side of the center bar 31 and thus provides sealing between the center bar 31 and the second gate 20.

The center bar 31 is formed along the height direction of the vehicle 1 or the first gate 10. Here, the height direction of the vehicle 1 and the height direction of the first gate 10 mean to the direction substantially perpendicular to the ground. The height direction of the vehicle 1 and the height direction of the first gate 10 are parallel, each other. The center bar 31 is formed in such a manner that a cross section thereof faces along the width direction of the vehicle 1. Thus, when the first gate 10 is closed, the cross section of the center bar 31 is positioned between the first gate 10 and the second gate 20.

The center bar 31 serves to support the center bar unit 30 along the height direction of the vehicle 1 in such a manner that the center bar unit 30 maintains a predetermined shape thereof.

A weatherstrip fastening portion 31b extends bidirectionally along a width direction of the center bar 31. The weatherstrip fastening portion 31b is arranged in parallel with the center bar 31. Both end portions of the weatherstrip fastening portion 31b extend in opposite directions along the width direction of the vehicle 1.

The center bar 31 and the weatherstrip fastening portion 31b are connected to each other with a connection portion 31a in between.

The first weatherstrip 32 and the second weatherstrip 33 are fitted onto the weatherstrip fastening portion 31b. The weatherstrip fastening portion 31b is formed in such a manner that both end portions thereof extend in opposite directions. The first weatherstrip 32 and the second weatherstrip 33 are fitted onto the both end portions, respectively, of the weatherstrip fastening portion 31b.

The first weatherstrip 32 and the second weatherstrip 33 are fitted onto the center bar 31. Thus, the center bar unit 30 provides the sealing between the first gate 10 and the second gate 20.

Figure 10:
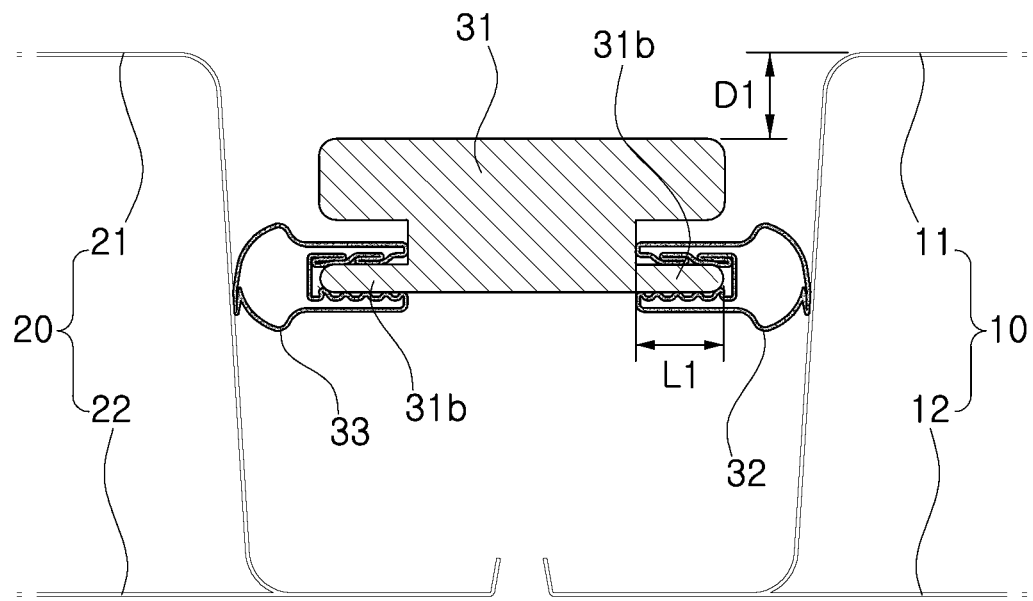
FIG. 10 is a cross-sectional view illustrating a state where the sealing assembly for a twin swing gate according to the present disclosure is installed on a portion A, indicated by a dashed line, of the gate in FIG. 9.
Figure 11:
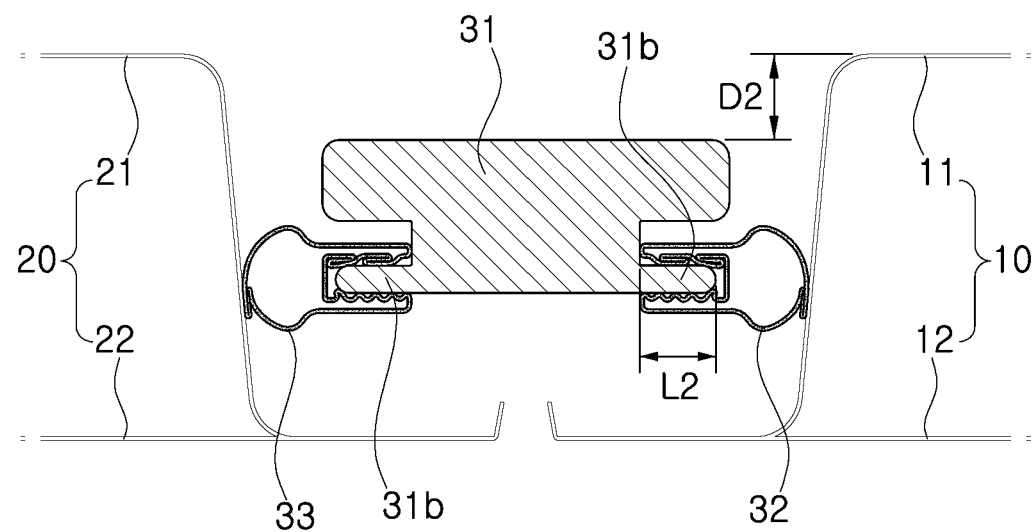
FIG. 11 is a cross-sectional view illustrating a state where the sealing assembly for a twin swing gate according to the present disclosure is installed on a portion B, indicated by a dashed line, of the gate in FIG. 9.
Figure 12:
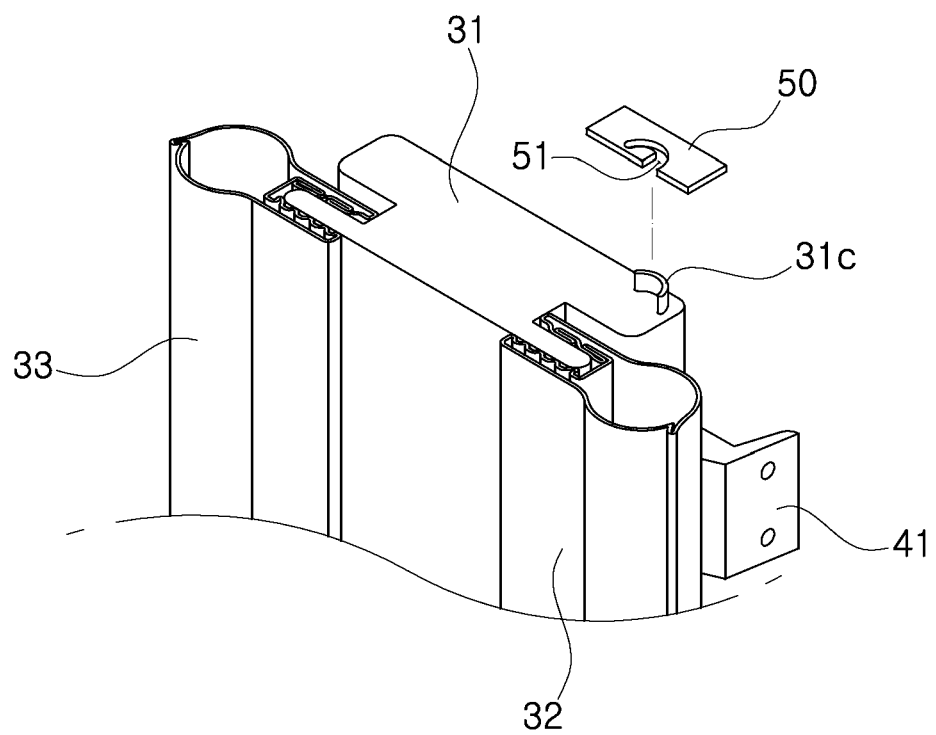
FIG. 12 is an enlarged perspective view illustrating a state where a guide of the sealing assembly for a twin swing gate according to the present disclosure is installed.

The center bar 31 is positioned at the same distance, along a height direction of the first gate 10, from the inner panel 11 of the first gate 10 and is positioned at the same distance, along a height direction of the second gate 20, from the inner panel 21 of the second gate 20. The first gate 10 and the second gate 20 form a complex curve in order that a glass pane or a character line is installed or formed, respectively, on the outer panel 12 of the first gate 10 and the outer panel 22 of the second gate 20. When the center bar 31 is formed in such a manner as to follow the outer panels 12 and 22, it is difficult to ensure water-tight performance of the center bar 31. Moreover, when rotated, the center bar 31 is not exactly in line with the axis of rotation. Thus, it is difficult to rotate the center bar 31. Therefore, the center bar 31 is set to be positioned at the same distance, along the height direction of the first gate 10, from the inner panel 11 of the first gate 10 and is set to be positioned at the same distance, along the height direction of the second gate 20, from the inner panel 21 of the second gate 20. In FIG. 10, the center bar 31 is spaced a distance "D1" apart from the inner panel 11. In FIG. 11, the center bar 31 is spaced a distance "D2" apart from the inner panel 21. These two distances are the same (D1=D2). At this point, that the center bar 31 is positioned at the same distance from the inner panel 11 of the first gate 10 and is positioned at the same distance from the inner panel 21 of the second gate 20 means that the center bar 31 is positioned at the same distance from a bending portion 11a of the inner panel 11 that is bent to be joined to the outer panel 12 and is positioned at the same distance from a bending portion 21a of the inner panel 21 that is bent to be joined to the outer panel 22.

In a case where, due to shapes of the outer panels 12 and 22, a distance between the outer panel 12 and the inner panel 11 and a distance between the outer panel 22 and the inner panel 21 vary. For this reason, where a length of the weatherstrip fastening portion 31b is fixed, the first weatherstrips 32 and the second weatherstrip 33 may not be brought into sufficiently close contact with the first gate 10 and the second gate 20. The weatherstrip fastening portion 31b is formed in such a manner that a length thereof varies so that the fitting of the first weatherstrips 32 and the second weatherstrip and 33 on the center bar 31 provides uniform sealing between the first gate 10 and the second gate 20. Specifically, the weatherstrip fastening portion 31b is formed in such a manner that the closer the center bar 31 and the outer panels 12 and 22 are to each other, the shorter the length of the weatherstrip fastening portion 31b. Accordingly, from FIGS. 10 and 11, it can be seen that "L1>L2".

A striker 34 that serves to keep the first gate 10 locked is provided on the center bar 31. A conventional latch (not illustrated) causes the striker 34 to lock or unlock of the first gate 10.

A center bar hinge 40 hinge-connects the center bar 31 to the first gate 10.

The center bar hinge 40 includes: a stationary portion 41 mounted on the first gate 10; a rotatable portion 42 mounted on the center bar 31 and rotating with respect to the stationary portion 41; and a hinge shaft 43 passing through the stationary portion 41 and the rotatable portion 42 and thus hinge-connecting the stationary portion 41 and the rotatable portion 42 to each other.

The stationary portion 41 and the rotatable portion 42 are formed in the shape of a block. In a state where the stationary portion 41 and the rotatable portion 42 are fastened to the first gate 10 and the center bar 31, respectively, the stationary portion 41 and the rotatable portion 42 are connected to each other with the hinge shaft 43. Thus, the center bar unit 30 is made rotatable with respect to the first gate 10.

Particularly, the center bar hinge 40 includes a spring 44 in such a manner that the center bar 31 is kept in being folded to the first gate 10 in a state where the first gate 10 is open.

Both end portions of the spring 44 are fixed to the stationary portion 41 and the rotatable portion 42, respectively. Thus, the spring 44 elastically supports the rotatable portion 42 in a manner that is brought into being folded to the stationary portion 41.

A guide 50 is provided in such a manner that, in conjunction with opening or closing the first gate 10, the center bar 31 is brought into being folded to the first gate 10 or expands from the first gate 10.

The guide 50 is installed on the vehicle body. The guide 50 rotates the center bar 31 in conjunction with opening or closing the first gate 10.

To this end, a guide protrusion 31c is on an upper end portion or a lower end portion of the center bar 31. A guide groove 51 accommodating and guiding the guide protrusion 31c is formed in the guide 50.

The guide groove 51 guides the guide protrusion 31c in such a manner that the center bar 31 is rotated in conjunction with opening or closing the first gate 10. The guide groove 51 is concavely formed in the shape of a semicircle in a manner that faces toward the inside of the vehicle 1. The first gate 10 and the second gate 20 are a tailgate of the vehicle 1. The guide groove 51 is concavely formed in a manner that faces toward the front of the vehicle 1. The guide groove 51 is formed to be open at one end portion thereof in such a manner that the guide protrusion 31c is inserted into or removed from one end portion thereof.

Operation of the sealing assembly for a twin swing gate according to the present disclosure that is configured as described above will be described as follows.

Figure 13:
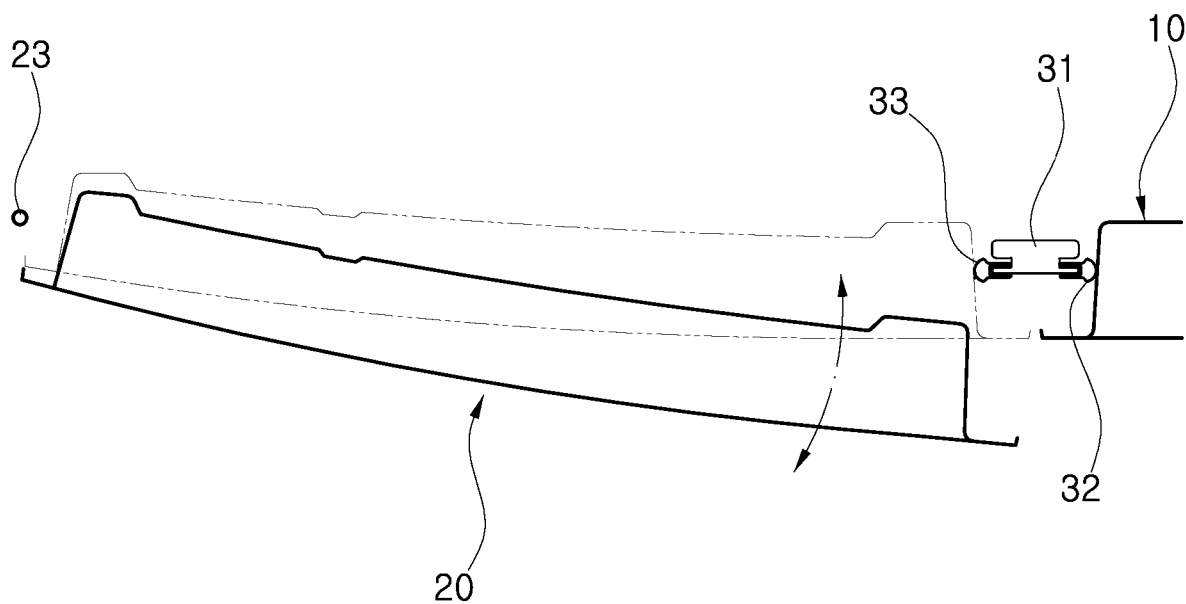
FIG. 13 is a plan view illustrating a state where a gate on which the sealing assembly for a twin swing gate according to the present disclosure is not installed is open and a state where the gate is closed.

FIG. 13 illustrates a state where a gate on which the center bar unit 30 is not installed, that is, the second gate 20, is open and closed. The second gate 20 is rotated about the gate hinge shaft 23 and thus is open or closed.

The center bar unit 30 is not installed on the second gate 20, and the inside end portion of the second gate 20 is positioned more rearward than the center bar unit 30. Therefore, the second gate 20 is open or closed without interfering with the center bar unit 30. When the second gate 20 is open, the inside end portion of the second gate 20 is spaced away from the second weatherstrip 33. When the second gate 20 is closed, the inside end portion of the second gate 20 gets back into contact with the second weatherstrip 33. Thus, the second gate 20 is sealed up.

Process of opening the first gate 10 are sequentially illustrated in FIGS. 14A to 17C.

Figure 14A:
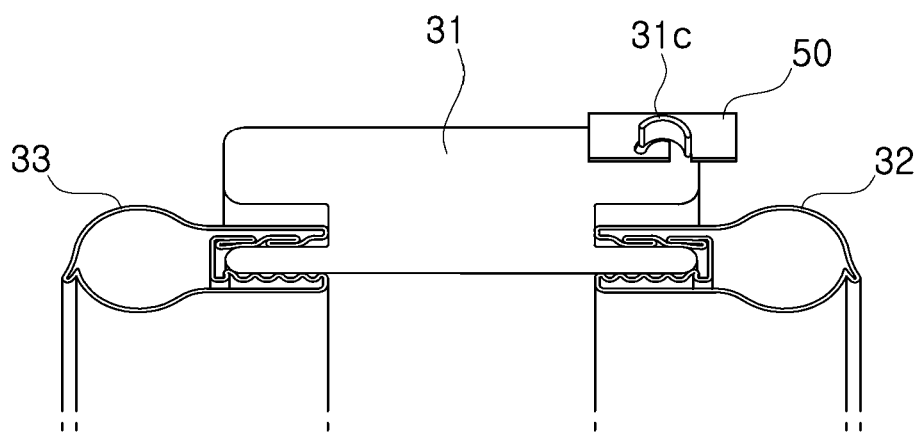
FIGS. 14A, 15A, 16A, and 17A are enlarged perspective views illustrating essential constituent elements of the sealing assembly for a twin swing gate according to the present disclosure that are held in a desired relationship with respect to each other while the gate on which the sealing assembly is installed is open.
Figure 14B:
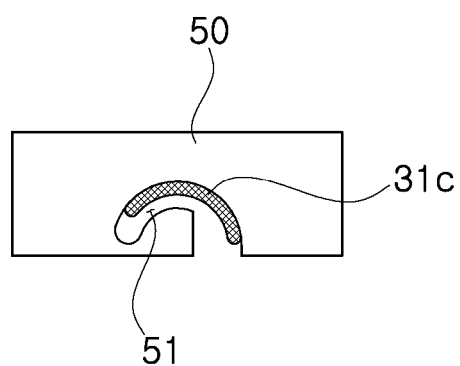
FIGS. 14B, 15B, 16B, and 17B are schematic views illustrating the guide and a guide protrusion that are held in a desired relationship with respect to each other while the gate on which the sealing assembly for a twin swing gate according to the present disclosure is installed is open.
Figure 14C:
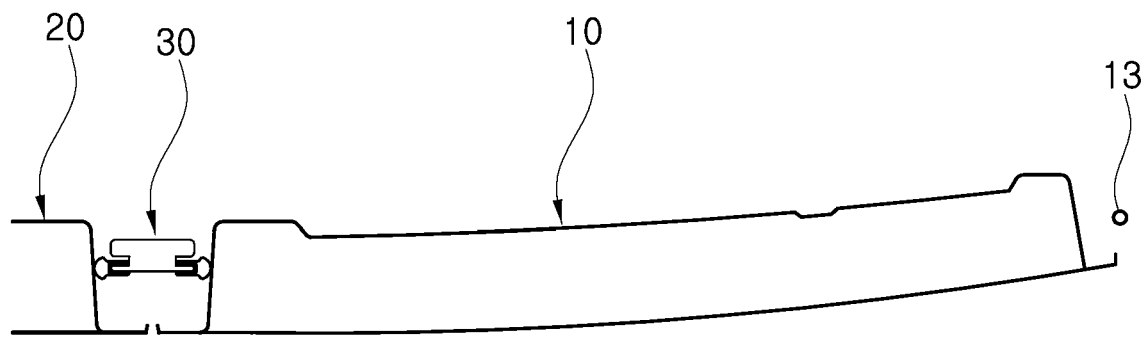
FIGS. 14C, 15C, 16C, and 17C are plan views illustrating a state where the gate on which the sealing assembly for a twin swing gate according to the present disclosure is installed is open.

FIGS. 14A, 14B, and 14C illustrate that in a state where the first gate 10 is closed, the striker 34 of the first gate 10 is held tightly in place by the gate latch and that the first weatherstrip 32 and the second weatherstrip 33 of the center bar unit 30 are brought into close contact with the inside end portion of the first gate 10 and the inside end portion of the second gate 20, respectively, thereby maintaining the sealing between the first gate 10 and the second gate 20.

In this state, moisture does not permeate between the first gate 10 and the second gate 20. For example, high-pressure washing water, although sprayed between the first gate 10 and the second gate 20, such as when washing the vehicle 1, is primarily blocked by the center bar 31 from permeating between the first gate 10 and the second gate 20. Moreover, the high-pressure washing water is blocked from permeating the vehicle 1 because the first weatherstrip 32 and the second weatherstrip 33 provide the sealing between the first gate 10 and the second gate 20.

Figure 15A:
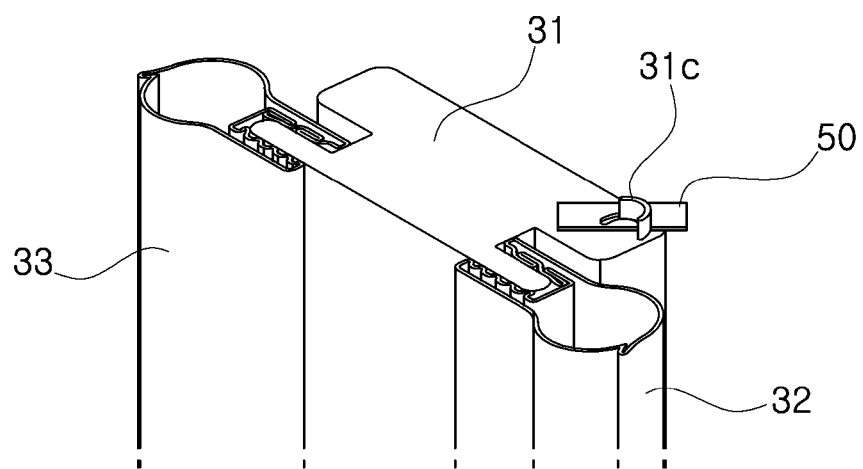
Figure 15B:
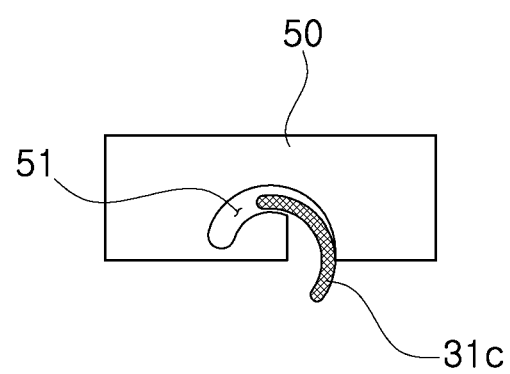
Figure 15C:
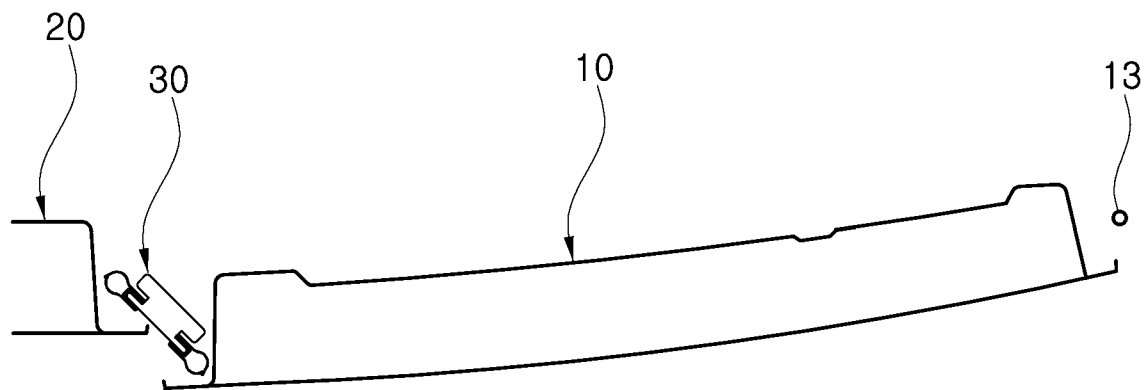

When a user pulls the first gate 10 by operating a handle in order to open the first gate 10, as illustrated in FIGS. 15A, 15B, and 15C, the gate latch no longer holds the striker 34 tightly in place, and thus the first gate 10 starts to be rotated.

FIG. 15C illustrates a state where the rotation of the first gate 10 is started.

As the first gate 10 starts to be rotated, the center bar unit 30 also starts to be rotated, together with the inside end portion of the first gate 10, about the gate hinge shaft 13. At this point, while the guide protrusion 31c is moved along the guide groove 51, in compliance with a profile of the guide groove 51, the center bar 31 is rotated about the hinge shaft 43 of the center bar hinge 40 and starts to be brought into contact with the inside end portion of the first gate 10. In addition, in the center bar unit 30, the second weatherstrip 33 is separated from the second gate 20.

Figure 16A:
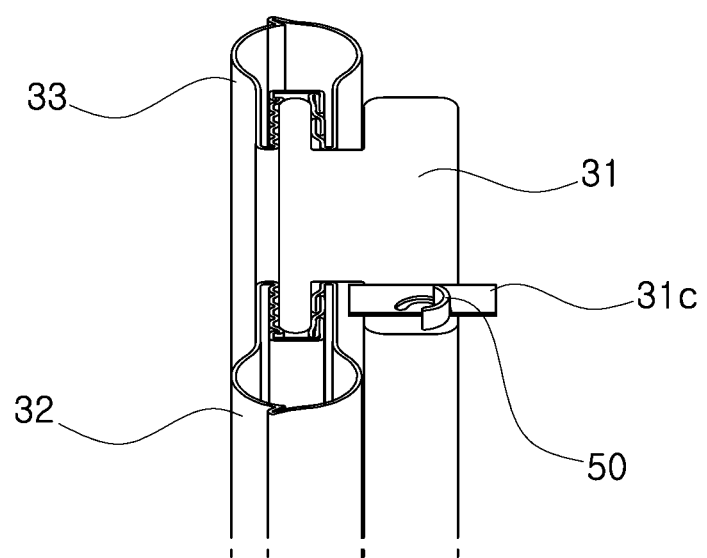
Figure 16B:
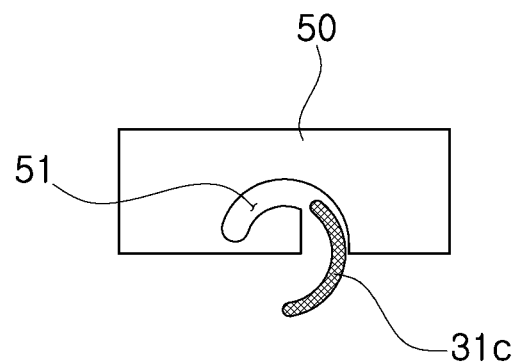
Figure 16C:
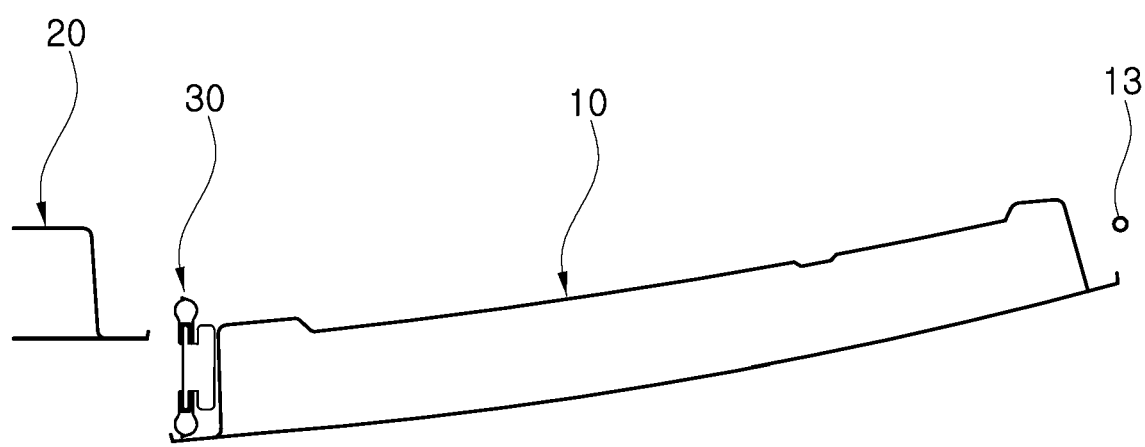

Subsequently, as illustrated in FIGS. 16A, 16B, and 16C, when the first gate 10 is further rotated, the center bar unit 30 is further rotated. The center bar unit 30, when maximally rotated by the guide groove 51, is in a state of being maximally brought into being folded to the inside end portion of the first gate 10. In this state, as illustrated in FIGS. 16A and 16B, the guide protrusion 31c is in a state of possibly deviating from the guide groove 51, and the center bar unit 30 is completely spaced away from the second gate 20, and thus does not interfere therewith when the second gate 20 is open or closed.

Figure 17A:
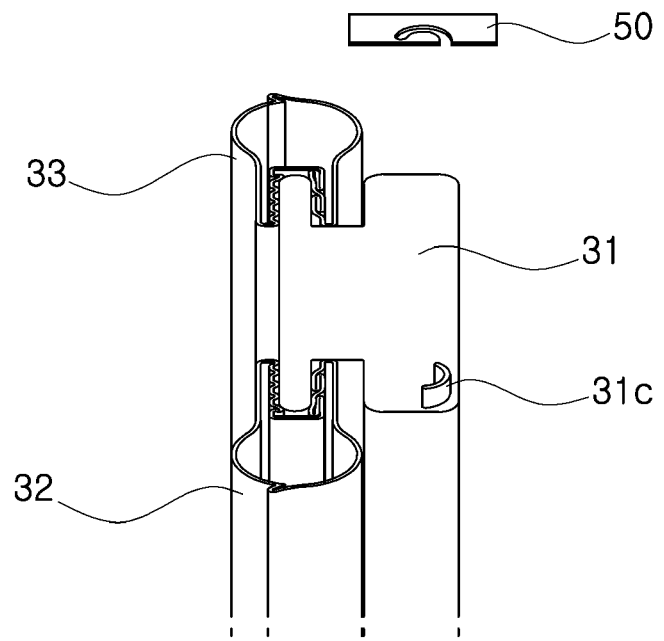
Figure 17B:
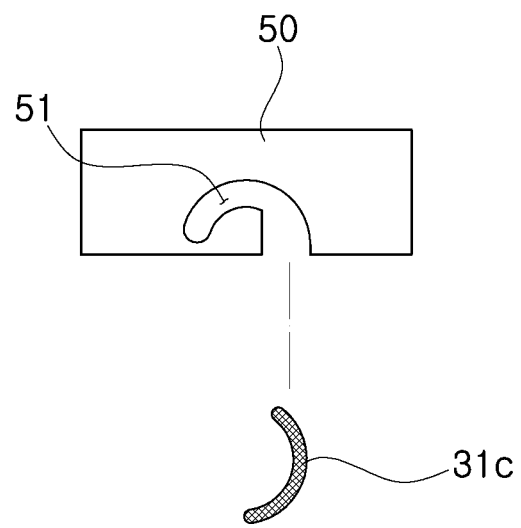
Figure 17C:
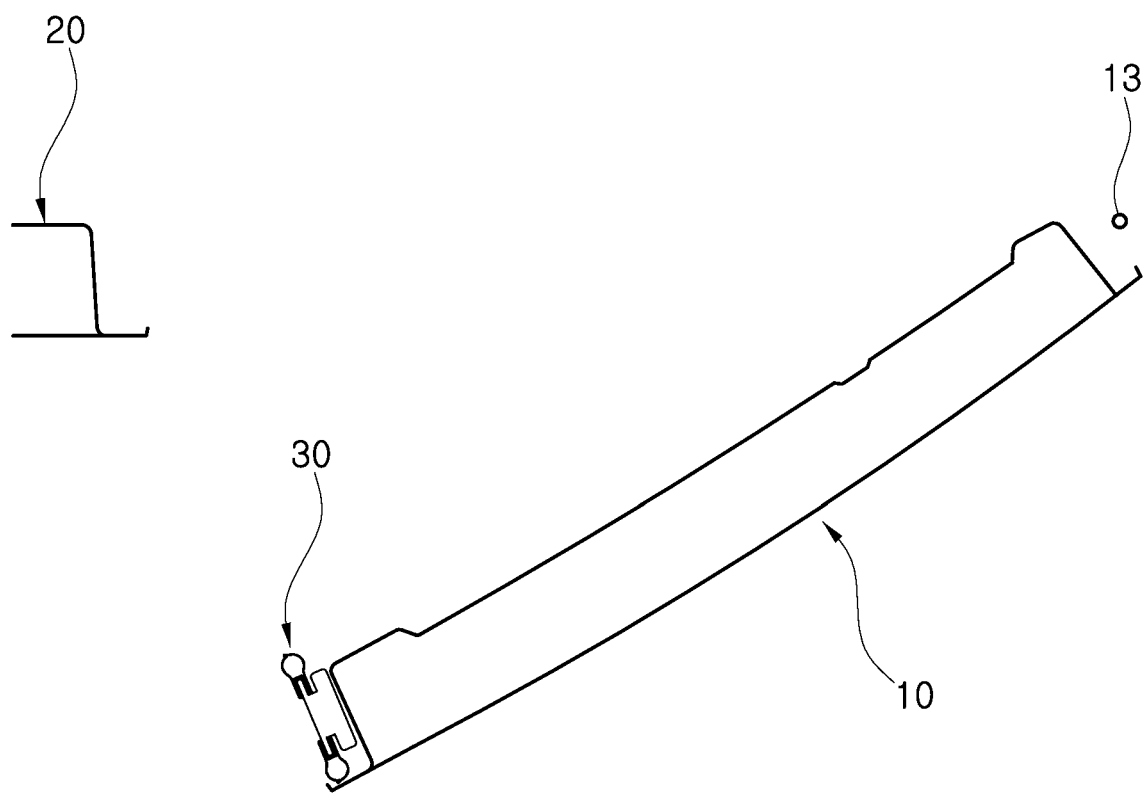

Subsequently, when the first gate 10 is further rotated, the center bar unit 30 deviates from the guide 50, and the center bar unit 30 does not interfere with the second gate 20 (refer to FIGS. 17A, 17B, and 17C). Accordingly, the first gate 10 is rotated up to a desired position at which the inside end portion thereof is separated from the second gate 20. Particularly, the center bar unit 30 is elastically supported by the spring 44. Therefore, the center bar unit 30, although separated from the guide 50 is kept in being folded to the first gate 10.

Furthermore, the first gate 10 and the second gate 20 are open at the same time, or the center bar unit 30, as described above, is rotated and is brought into being folded to the first gate 10. Therefore, the first gate 10 and the second gate 20 may be open without interfering with each other.

In a case where the first gate 10 is closed, as opposed to the case illustrated in FIGS. 14A to 17C, the first gate 10 and the center bar unit 30 operate, and thus the first gate 10 is closed.

In addition, in a case where both the first gate 10 and the second gate 20 are changed from the open state to the closed state, the center bar unit 30 is rotated in such a manner that the center bar unit 30 expands immediately before being changed from the state of being brought into being folded the first gate 10 to the completely closed state. Thus, the second weatherstrip 33 and the inside end portion of the second gate 20 are brought into contact with each other, and thus the second gate 20 is sealed up.

What is claimed is:

1. A vehicle comprising:
   a vehicle body;
   a first gate of which an outside end portion is hinge-connected to the vehicle body;
   a second gate of which an outside end portion is hinge-connected to the vehicle body and configured to be rotated in a direction opposite to rotation of the first gate; and
   a center bar unit installed along a height direction of the vehicle body on an inside end portion of the first gate, the center bar unit being configured to rotate in conjunction with opening or closing the first gate such that the center bar unit is brought into contact with an inside end portion of the second gate when the first gate is closed and is spaced away from the inside end portion of the second gate when the first gate is open,
   wherein the center bar unit comprises:
      a center bar extending in the height direction of the vehicle body;
      a first weatherstrip fitted onto a first side of the center bar and configured to seal between the center bar and the first gate; and
      a second weatherstrip fitted onto a second side of the center bar facing opposite of the first weatherstrip and configured to seal between the center bar and the second gate,
   wherein the center bar comprises:
      a weatherstrip fastening portion bidirectionally extending along a length direction of the center bar, the first weatherstrip and the second weatherstrip each being fitted onto the weatherstrip fastening portion; and
      a connection portion connecting the center bar and the weatherstrip fastening portion to each other;
   wherein a distance between the center bar and an outer panel of the first gate varies along the height direction of the vehicle body;
   wherein a length of the weatherstrip fastening portion varies along the height direction of the vehicle body in such a manner that the length of the weatherstrip fastening portion is shorter in regions where the center bar is closer to the outer panel and longer in regions where the center bar is farther from the outer panel; and
   wherein, when the first gate and the second gate are closed, the first weatherstrip is in contact with the first gate and the second weatherstrip is in contact with the second gate along the height direction of the vehicle body.

2. The vehicle of claim 1, wherein a distance between center bar and an inner panel of the first gate is constant along a height direction of the first gate.

3. The vehicle of claim 1, wherein a distance between the outer panel of the first gate and an inner panel of the first gate varies along a height direction of the first gate.

4. The vehicle of claim 1, further comprising a center bar hinge hinge-connecting the center bar to the first gate, wherein the center bar hinge comprises:
   a stationary portion configured to be adjacent the first gate when the first gate is closed;
   a rotatable portion mounted on the center bar and configured to rotate with respect to the stationary portion; and
   a hinge shaft passing through the stationary portion and the rotatable portion and hinge-connecting the stationary portion and the rotatable portion to each other.

5. The vehicle of claim 4, wherein the center bar hinge further comprises:
   a spring configured to elastically support the center bar such that the rotatable portion is folded to the stationary portion.

6. The vehicle of claim 1, further comprising:
   a guide installed on the vehicle body and configured to rotate the center bar in conjunction with opening or closing the first gate.

7. The vehicle of claim 6, wherein a guide protrusion is on an upper end portion or a lower end portion of the center bar, and wherein a guide groove guiding the guide protrusion is configured such that the center bar is rotated in conjunction with opening or closing the first gate.

8. The vehicle of claim 7, wherein the guide groove is concave in the shape of a semicircle in a manner that faces toward the inside of the vehicle body, and wherein the guide groove is open at one end portion thereof adjacent to the first gate, the guide groove being configured such that the guide protrusion is inserted into or removed from one end portion thereof.

9. The vehicle of claim 1, wherein an inside end portion of the second gate is positioned more rearward toward a rear of the vehicle body than the center bar unit.

10. A vehicle having a twin swing gate, the vehicle comprising:
    a vehicle body;
    a first gate hinge-connected to the vehicle body;
    a second gate hinge-connected to the vehicle body and configured to be rotated in a direction opposite to rotation of the first gate; and
    a center bar installed along a height direction of the vehicle body on an inside end portion of the first gate, the center bar comprises:
       a first weatherstrip fitted onto a first side of the center bar and configured to seal between the center bar and the first gate; and
       a second weatherstrip fitted onto a second side of the center bar and configured to seal between the center bar and the second gate, the center bar being configured to rotate in conjunction with opening or closing the first gate;
       a weatherstrip fastening portion bidirectionally extending along a length direction of the center bar, the first weatherstrip and the second weatherstrip each being fitted onto the weatherstrip fastening portion; and
       a connection portion connecting the center bar and the weatherstrip fastening portion to each other;
    wherein a distance between the center bar and an outer panel of the first gate varies along the height direction of the vehicle body;
    wherein a length of the weatherstrip fastening portion varies along the height direction of the vehicle body in such a manner that the length of the weatherstrip fastening portion is shorter in regions where the center bar is closer to the outer panel and longer in regions where the center bar is farther from the outer panel; and
    wherein, when the first gate and the second gate are closed, the first weatherstrip is in contact with the first gate and the second weatherstrip is in contact with the second gate along the height direction of the vehicle body.

11. The vehicle of claim 10, wherein the center bar is configured such that the center bar is brought into contact with an inside end portion of the second gate when the first gate is closed and is spaced away from the inside end portion of the second gate when the first gate is open.

12. The vehicle of claim 10, further comprising a center bar hinge hinge-connecting the center bar to the first gate, wherein the center bar hinge comprises:
   a stationary portion configured to be adjacent the first gate when the first gate is closed;
   a rotatable portion mounted on the center bar and configured to rotate with respect to the stationary portion; and
      a hinge shaft passing through the stationary portion and the rotatable portion and hinge-connecting the stationary portion and the rotatable portion to each other.

13. The vehicle of claim 12, wherein the center bar hinge further comprises:
   a spring configured to elastically support the center bar such that the rotatable portion is folded to the stationary portion.

14. The vehicle of claim 10, further comprising:
   a guide installed on the vehicle body and configured to rotate the center bar in conjunction with opening or closing the first gate;
   a guide protrusion on the center bar; and
   a guide groove on the vehicle body, the guide groove configured to guide the guide protrusion such that the center bar is rotated in conjunction with opening or closing the first gate.

15. The vehicle of claim 14, wherein the guide protrusion is on an upper end portion of the center bar.

16. The vehicle of claim 14, wherein the guide protrusion is on a lower end portion of the center bar.

17. The vehicle of claim 14, wherein the guide groove is concave in the shape of a semicircle in a manner that faces toward the inside of the vehicle body, and wherein the guide groove is open at one end portion thereof adjacent to the first gate, the guide groove being configured such that the guide protrusion is inserted into or removed from one end portion thereof.

18. A vehicle comprising:
   a vehicle body;
   a first gate of which an outside end portion is hinge-connected to the vehicle body;
   a second gate of which an outside end portion is hinge-connected to the vehicle body and configured to be rotated in a direction opposite to rotation of the first gate; and
   a center bar unit installed along a height direction of the vehicle body on an inside end portion of the first gate, the center bar unit being configured to rotate in conjunction with opening or closing the first gate such that the center bar unit is brought into contact with an inside end portion of the second gate when the first gate is closed and is spaced away from the inside end portion of the second gate when the first gate is open;
   wherein the center bar unit comprises:
      a center bar extending in the height direction of the vehicle body;
      a first weatherstrip fitted onto a first side of the center bar and configured to seal between the center bar and the first gate; and
      a second weatherstrip fitted onto a second side of the center bar facing opposite of the first weatherstrip and configured to seal between the center bar and the second gate,
   wherein the center bar comprises:
      a weatherstrip fastening portion bidirectionally extending along a length direction of the center bar, the first weatherstrip and the second weatherstrip each being fitted onto the weatherstrip fastening portion; and
      a connection portion connecting the center bar and the weatherstrip fastening portion to each other;
   wherein a distance between the center bar and an outer panel of the first gate varies along the height direction of the vehicle body;
   wherein a distance between the center bar and an inner panel of the first gate is constant along the height direction of the first gate;
   wherein a length of the weatherstrip fastening portion varies along the height direction of the vehicle body by an amount that compensates for variations in the distance between the center bar and the outer panel of the first gate; and
   wherein, when the first gate and the second gate are closed, the first weatherstrip is in contact with the first gate and the second weatherstrip is in contact with the second gate along the height direction of the vehicle body.

19. The vehicle of claim 18, further comprising a center bar hinge hinge-connecting the center bar to the first gate, wherein the center bar hinge comprises:
   a stationary portion configured to be adjacent the first gate when the first gate is closed;
   a rotatable portion mounted on the center bar and configured to rotate with respect to the stationary portion; and
   a hinge shaft passing through the stationary portion and the rotatable portion and hinge-connecting the stationary portion and the rotatable portion to each other.

20. The vehicle of claim 18, further comprising:
   a guide installed on the vehicle body and configured to rotate the center bar in conjunction with opening or closing the first gate.

* * * * *